Nov. 25, 1958  N. GILMAN  2,861,463
SAFETY DEVICES FOR VEHICLES
Filed Dec. 2, 1954
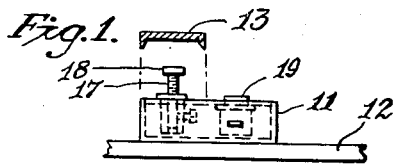
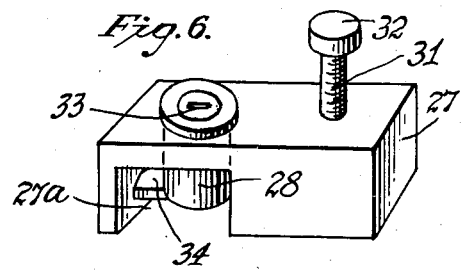
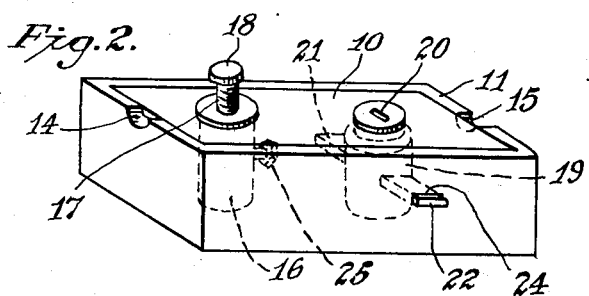
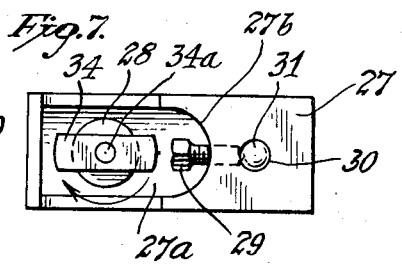
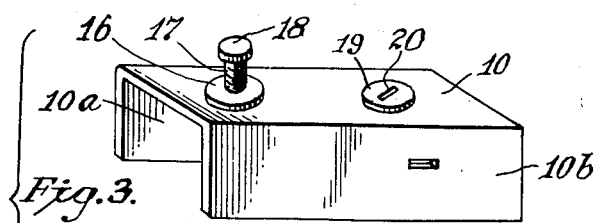
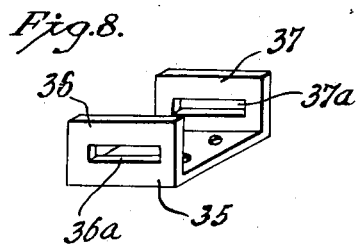
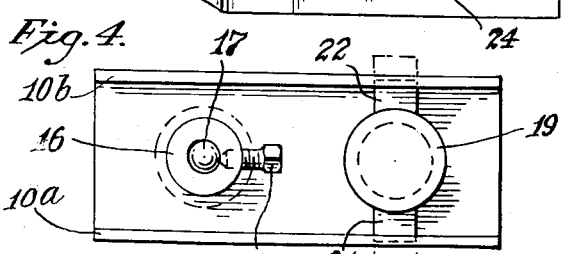
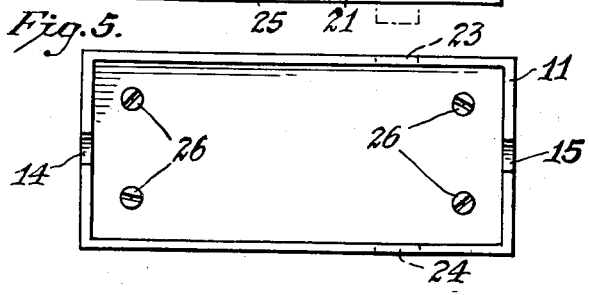
NORMAN GILLMAN
INVENTOR.
BY Michael Ebert
ATTORNEY.

United States Patent Office 2,861,463
Patented Nov. 25, 1958

2,861,463

SAFETY DEVICES FOR VEHICLES

Norman Gilman, Crestwood, N. Y.

Application December 2, 1954, Serial No. 472,743

4 Claims. (Cl. 74—526)

The present invention relates generally to new and useful improvements in safety devices for limiting the driving speed of automotive vehicles and more particularly to an adjustable stop device adapted to cooperate with the accelerator pedal of an automobile to restrict the maximum operating speed thereof.

Many automobile accidents are traceable to the operation of the vehicle at excessive speeds. The modern automobile is capable of high-speed operation well beyond the maximum limits tolerated by law or, for that matter, those limits dictated by the rules of safety. Experiance has also shown that while mature drivers will operate a family car carefully and at reasonable speeds, the same car in the hands of a younger member of the family will not be treated with similar caution.

Various proposals have been made to restrict motor speed by means of governors and other mechanism coupled to the fuel system of an internal combustion engine. These proposals, while serving their purpose more or less effectively, entail fairly elaborate mechanisms requiring difficult and expensive installations. Another and perhaps more serious drawback of the prior art devices is that while they function when properly adjusted to restrict motor speed, such adjustment is not secure against tampering by an unauthorized operator. Hence, an irresponsible driver may find it possible without too much difficulty to alter the adjustment of the device and thereby drive at excessive speeds.

With a view to overcoming the above-noted disadvantages, it is the principal object of the present invention to provide a speed-limiting safety device of simple, inexpensive construction which may readily be installed in any existing vehicle without in any way modifying the engine mechanism.

More particularly, it is an object of the invention to provide a safety device of this type, which may be detachably coupled to the floorboard of a vehicle in cooperative relation to the accelerator pedal and wherein the adjustment means for the device is secured against tampering when the device is coupled to the floorboard.

Still another object of the invention is to provide a safety device having a stop member for engaging an accelerator pedal to limit its downward movement, the adjusting means for said stop member being inaccessible when the device is coupled to the floorboard.

Briefly stated, these advantages are attained according to the invention by a safety device comprising a base member on the underside of which is mounted a socket for receiving the end of a stop element projecting above the base, the socket being provided with adjustable means to hold the inserted stop element at a predetermined position. Means are provided including a locking mechanism to couple the base member to a mounting element secured to the floorboard of the vehicle. When the base is so coupled the adjusting means is inaccessible.

For a better understanding of the invention as well as other objects and further features thereof, reference is had to the following detailed description of the invention to be read in connection with the accompanying drawing wherein like components are identified by like reference numerals.

In the drawing:

Fig. 1 is an elevational view of one preferred embodiment of a safety device in accordance with the invention as it appears when installed in a vehicle;

Fig. 2 is a perspective view of said safety device;

Fig. 3 is a perspective view of said device as it appears with the base member separated from the mounting element;

Fig. 4 is a bottom plan view of the base member;

Fig. 5 is a top plan view of the mounting element;

Fig. 6 is a perspective view of a second preferred embodiment of the invention showing the base member detached from the mounting element;

Fig. 7 is a bottom plan view of the base member; and

Fig. 8 is a perspective view of the mounting element.

Referring now to the drawing and more particularly to Figs. 1 to 5, there is shown a preferred embodiment of a speed limiting safety device in accordance with the invention comprising a base member 10 and a mounting element 11. The safety device is attached to the floorboard 12 of an automotive vehicle at a position thereon below the accelerator pedal 13.

Base member 10 is formed by a single rectangular sheet of metal whose short ends 10a and 10b are bent at right angles to the plane of the sheet, base member 10 being received within mounting element 11. Mounting element 11 is in the form of a rectangular open top box whose opposing side walls are provided with notches 14 and 15 which facilitate removal of the base member therefrom.

Vertically mounted on the underside of base member 10 is a metal cylinder 16 having an internally threaded longitudinal bore. Projecting upwardly from base member 10 is a stop post 17 threadably received within cylinder 16 and having a flat head 18. Also mounted vertically on the underside of base member 11 is a key-operated lock 19 having a slot 20 into which a key is insertable. Lock 19 is provided with a pair of oppositely-directed, laterally-extending bolts 21 and 22. Bolts 21 and 22, when the key is turned in one direction, are retracted within the lock and when the key is turned in the other direction slide outwardly, to pass through rectangular slots in base member 10 and through correspondingly positioned slots 23 and 24 in mounting element 11, thereby latching the base member to the mounting element. Extending laterally into cylinder 16 is a set screw 25 which frictionally engages post 17 to maintain the post at an adjusted position.

The floor of the mounting element 11 is provided with suitable bores into which are inserted mounting screws 26 for securely attaching the element to the floorboard of the vehicle.

To install the device, the mounting element is attached to the floorboard at a position at which the post is in vertical alignment with the pedal below the accelerator pedal, and the post 17 is then adjusted in height to a point at which the downward stroke of the accelerator pedal 13 is limited to the desired maximum speed. The set screw 25 is then tightened to fix the position of the post. The base member 10 is then locked to the mounting element 11 by turning the key to extend bolts 21 and 22 into slots 23 and 24. Thus the base member cannot be removed from the mounting element and access is denied to the set screw 25, thereby preventing an irresponsible car operator from tampering with the speed adjustment.

In the second preferred embodiment of the invention illustrated in Figs. 6 to 8, the base member 27 is fabricated from a solid rectangular block of metal, such as brass. A rectangular groove is cut transversely in the block below the top wall thereof to define a recess 27a for accommodating a key-operated rotary lock 28. Groove 27a is provided with an arcuate extension 27b affording access to the head of a set screw 29 extending laterally and at an angle into a vertical bore 30. Bore 30 is formed in the solid portion of the block and is threaded to receive a stop post 31 having a head 32.

Lock 28 is provided with an upper flange which seats on the top wall of the block, the body of the lock being disposed within groove 27a. The lock is operated by inserting a key into slot 33. Rotation of the key effects rotation of a wing element 34 mounted on a shaft 34a.

The complementary mounting element 35 for the base member 27 comprises side panels 36 and 37 having slots 36a and 37a formed therein, the mounting element being received within the groove 27a such that the side panels 36 and 37 lie flush with the side walls of the block. The wing element 34 of the lock is adapted to enter slots 36a and 37a in the panels of the mounting element when the key is turned to close the clock, thereby latching the base member to the mounting element and preventing access to set screw 29. The mounting element may be screwed or otherwise attached to the floorboard.

It will be evident that in this arrangement there is no need to provide a cylinder for supporting the stop post since the solid portion of the base block serves this purpose. The complementary base member and mounting element constitute a sturdy and highly compact structure which may be mounted inconspicuously below the accelerator pedal.

While there has been disclosed what at present are considered to be preferred embodiments of the invention, it will be obvious that many changes and modifications may be made therein without departing from the essential spirit of the invention as defined in the appended claims.

I claim:

1. A speed limiting safety device for restricting the downward stroke of an accelerator pedal of a vehicle provided with a floorboard, comprising a base member having a top wall and a recess therebelow, a vertical stop post mounted above said top wall and extending into said member, a set screw disposed within said member to engage said post for maintaining an adjusted height thereof, said screw being accessible from said recess, a complementary mounting element for said base member adapted to enclose said recess, said element being attachable to said floorboard, and means to lock said member to said element.

2. A speed limiting safety device for restricting the downward stroke of an accelerator pedal of a vehicle provided with a floorboard, comprising a base member having a top wall and a recess therebelow, a vertical stop post mounted above said top wall and extending into said member, a set screw disposed within said member to engage said post for maintaining an adjusted height thereof, said screw being accessible from said recess, a complementary mounting element for said base member adapted to enclose said recess, said element being attachable to said floorboard, and a key-operated lock mounted in said base member and having a key-receiving slot on said top wall, said lock being adapted to latch said member onto said element.

3. A speed limiting safety device for restricting the downward stroke of an accelerator pedal of a vehicle provided with a floorboard, comprising a base member having a top wall and a recess therebelow, a vertical stop post mounted above said top wall and extending into said member, a set screw disposed within said member to engage said post for maintaining an adjusted height thereof, said screw being accessible from said recess, a complementary mounting element for said base member adapted to enclose said recess, said element being attachable to said floorboard, and a key-operated lock mounted in said base member and having a key receiving slot on said top wall, said lock being provided with lateral bolt means adapted to enter slots formed in said mounting element to secure said member to said element.

4. A speed-limiting safety device for destricting the downward stroke of an accelerator pedal of a vehicle provided with a floorboard comprising a box-shaped mounting element having an open top, a base member receivable within said element and having a top wall and a pair of opposed side walls having slots at corresponding positions therein, a cylinder mounted below said top wall, a stop post projecting above said base member and extending into said cylinder, a set screw extending laterally into said cylinder below said top wall to engage said post, and a key operated lock mounted below said top wall and having a pair of lateral bolts adapted to enter said slots in said side walls and a second pair of slots in said mounting element in registration with said first slots.

References Cited in the file of this patent

UNITED STATES PATENTS

| | | |
|---|---|---|
| 1,712,813 | Croll et al. | May 14, 1929 |
| 2,251,087 | Vincent | July 29, 1941 |
| 2,348,265 | Rippingville | May 9, 1944 |
| 2,679,744 | Hildebrand | June 1, 1954 |
| 2,762,641 | Gilmour | Sept. 11, 1956 |